United States Patent Office 3,300,503
Patented Jan. 24, 1967

3,300,503
NITROGEN-CONTAINING FLUORO-
PHOSPHORANES
Reinhard Schmutzler, Wilmington, Del., assignor to E. I.
du Pont de Nemours and Company, Wilmington, Del.,
a corporation of Delaware
No Drawing. Filed Sept. 19, 1963, Ser. No. 310,128
11 Claims. (Cl. 260—293)

The present invention relates to processes for the preparation of organic phosphorus-nitrogen compounds and to certain novel compounds prepared thereby.

The novel compounds of the present invention have the structure $A_a$–B wherein A is selected from the group consisting of $(R^1{}_2NH_2)^+$, $(NO)^+$, and $R^1{}_2N$; B is selected from the group consisting of $PF_6$ and $(RPF_5)^-$ where $a$ is 1 when A and B are charged, and 1 or 2 when A and B are not charged; $c$ is 3 or 4 and the sum of $a$ and $c$ is 5; and when A is charged B has an opposite and equal charge. $R^1$ is an organic aliphatic or alicyclic radical of up to 20 carbon atoms either monovalent or a divalent radical in which both bonds of the divalent radical are attached to the nitrogen of $R^1{}_2NH_2{}^+$ or $R^1{}_2N$ to form a heterocyclic ring. R is an organic aromatic, aliphatic, or alicyclic radical of up to 20 carbon atoms. More specifically the compounds of the invention are $(R^1{}_2NH_2)^+(RPF_5)^-$, $(NO)^+(RPF_5)^-$ and $(R^1{}_2N)_aPF_c$ where R, $R^1$, $a$ and $c$ have the significance above.

In the preferred compounds of the present invention $R^1$ contains up to 5 carbon atoms and R contains up to 8 carbon atoms.

Novel compounds of the present invention include:

$(CH_3)_2NPF_4$
$(C_3H_7)_2NPF_4$
$(iso\text{-}C_3H_7)_2NPF_4$
$(C_4H_9)_2NPF_4$
$(iso\text{-}C_4H_9)_2NPF_4$
$(sec\text{-}C_4H_9)_2NPF_4$
$(n\text{-}C_5H_{11})_2NPF_4$
$(C_6H_5CH_2)_2NPF_4$
$(C_6H_5CH_2CH_2)_2NPF_4$
$(cyclohexyl)_2NPF_4$
$(cyclohexyl\text{-}CH_2)_2NPF_4$
$[(C_3H_7)_2NH_2]^{\oplus}[CH_3C_6H_4PF_5]^{\ominus}$
$[(C_4H_9)_2NH_2]^{\oplus}[C_3H_7PF_5]^{\ominus}$
$[(C_5H_{11})_2NH_2]^{\oplus}[C_4H_9PF_5]^{\ominus}$
$[(C_6H_{13})_2NH_2]^{\oplus}[cyclohexyl\text{-}PF_5]^{\ominus}$
$[(iso\text{-}C_4H_9)_2NH_2]^{\oplus}[C_6H_5CH_2PF_5]^{\ominus}$
$[(cyclohexyl)_2NH_2]^{\oplus}[p\text{-}CH_3O\text{--}C_6H_4PF_5]^{\ominus}$
$[(C_6H_5CH_2)_2NH]_2^{\oplus}[iso\text{-}C_3H_7PF_5]^{\ominus}$
$[(C_6H_5CH_2CH_2)_2NH_2]^{\oplus}[cyclohexyl\text{-}CH_2PF_5]^-$
$((CH_3)_2N)_2PF_3$
$[(C_2H_5)_2N]_2PF_3$
$(n\text{-}C_3H_7)_2N)_2PF_3$
$(iso\text{-}C_3H_7)_2N)_2PF_3$
$(piperidyl)_2PF_3$
$(n\text{-}dodecylphenyl)_2NPF_4$
$(1\text{-}azacyclododecyl)PF_4$
$(1\text{-}azacyclooctadecyl)PF_4$
$(NO)^+(C_6H_5PF_5)^-$
$(NO)^+(CH_3PF_5)^-$
$(NO)^+(C_3H_7PF_5)^-$
$(NO)^+(cyclohexyl\text{-}PF_5)^-$
$(NO)^+(p\text{-}CH_3C_6H_4PF_5)^-$
$(NO)^+(n\text{-}C_4H_9PF_5)^-$ The process of the present invention is illustrated by the following equation:

$xR^4PF_4 + y(R^1{}_2N)_{4-n}R^2 \rightarrow hR^4PF_3NR^1{}_2$
$+ i(R^4PF_5)^-(R^1{}_2NH_2)^+ + j(R^3{}_nSiF_{4-n} + k(R^1{}_2N)_2PF_3$ wherein $R^4$ is R, fluorine or $R^1{}_2N$, defined hereinbefore, $R^2$ is hydrogen or $SiR^3{}_n$, $R^3$ is methyl or ethyl and wherein $R^4$ is organic and $R^2$ is H; $x=2$, $y=2$, $h=1$, $i=1$, $j=0$, $k=0$, and $n=3$
when $R^4$ is organic and $R^2$ is $R^3{}_nSi$; $x=1$, $y=1$, $h=1$, $i=0$, $j=1$, $k=0$, and $n=3$
when $R^4$ is F and $R^2$ is H; $x=3$, $y=4$, $h=0$, $i=2$, $j=0$, $k=1$, and $n=3$
when $R^4$ is F and $R^2$ is $R^3{}_nSi$; $x=1$, $y=1$, $h=1$, $i=0$, $j=1$, $k=0$, and $n$ is 2 or 3.

This process comprises reacting a compound having the structure $R^4PF_4$ with a compound having the structure $(R^1{}_2N)_{4-n}R^2$ wherein the symbols have the meaning given hereinbefore at a temperature about from —40° C. to 200° C. and preferably about from 0° to 70. Referring to the above general equation for the reaction, if $R^2$ is hydrogen, the products of the reaction are $R^4PF_3NR^1{}_2$ and $(R^4PF_5)^-(R^1{}_2NH_2)^+$. If $R^2$ is $SiR^3{}_n$, the $(R^1{}_2N)_{4-n}R^3$ reactant is a silane such as $R^1{}_2NSiR^3{}_3$ or $(R^1{}_2N)_2SiR^3{}_2$ and the products are $R^4PF_3NR^1{}_2$ and $R^3{}_3SiF$ or $R^3{}_2SiF_2$; if $R^4$ is fluorine, $R^4PF_4$ becomes $PF_5$ and $(R^4PF_5)^-$ becomes $(PF_6)^-$.

The $R^4PF_4$ and $(R^1{}_2N)_{4-n}R^2$ reactants are preferably used in stoichiometric proportions but an excess of either reactant can be used. In general, however, the yield of product will depend on the reactant present in lesser quantity.

The temperature of reaction is from about —40° C. to about 200° C. with the preferred range being from about 0° to 70° C. In general, from 0.5 hour to 3 hours is required to complete the reaction.

Inert diluents can be used for the reactants but are not necessary. Such inert diluents include ether, tetrahydrofuran, diisopropyl ether, dioxane, pentane, cyclohexane, benzene, toluene, $CCl_4$ and the Freons.

The products are isolated by conventional means, generally by distillation of the reaction mixtures under reduced pressure.

The compounds of the present invention as well as the compounds having the structure $RPF_3NR^1{}_2$ are useful as cocatalysts for the anionic polymerization of lactams, e.g., ε-caprolactam, as exemplified hereinafter. A discussion of anionic polymerization of ε-caprolactam is found in U.S. Patent 3,017,391.

The invention is illustrated by the following examples which are not intended to be limiting. Parts and percentages where given are by weight. The following abbreviations are used in describing the spectra given: bd—broad; sh—shoulder; w—weak; s—strong; m—medium; vs—very strong; TMSi—tetramethylsilane.

Example 1

Twenty and two-tenths parts phenyltetrafluorophosphorane is added dropwise with stirring over 20 min. to 14.5 parts of N,N-diethylaminotrimethylsilane. A slow rise of the temperature is noted, mainly only *after* the addition of the fluorophosphorane is completed. At 65° C., formation of gas commenced and a total of 9.0 parts (98%) of trimethylfluorosilane, identified by infrared, is collected, after stirring at an inner temperature of 70–90° C. has continued for 1 hr.

The less volatile residue is distilled in vacuo through a 10-in. helix packed column. Yield 20.4 parts (86%), B.P. 70° C./0.5 mm.; $n_D{}^{25}=1.4689$. These data, and the infrared spectrum, are in complete agreement to those of phenyldiethylaminotrifluorophosphorane.

Example 2

A vigorous reaction occurs when 40.5 parts of phenyltetrafluorophosphorane are added dropwise with stirring to 20.2 parts bis-N,N-diethylaminodimethylsilane; the color of the reaction mixture turns to a dark brown. By means of ice cooling, the temperature is held below 40° C. After the addition is completed and the exothermic reaction has subsided (40 min.), the mixture is heated to a maximum temperature of 90° C. (40 min.). Above 50° C., vigorous evolution of gas commences, 8.1 parts (84%) dimethyldifluorosilane being collected and identified by infrared after analytical purity had been established by vapor phase chromatography.

The less volatile residue is distilled in vacuo through a 10-in. helix packed column. The yield is 42.2 parts (89%), B.P. 60° C./0.08 mm.; $n_D^{26}$=1.4695. These data and the infrared spectrum are in excellent agreement to those of phenyldiethylaminotrifluorophosphorane.

*Example 3*

A three-necked flask is equipped with a gas inlet tube, a thermometer, and a reflux condenser with a drying tube. The system is flushed with dry nitrogen and charged with a solution of 44 parts of phenyltetrafluorophosphorane in 105 parts ether. Dimethylamine (11.0 parts), dried by passing it through a tube filled with sodium hydroxide pellets, is bubbled through the solution at 0° C. (2 hr.). A precipitate is formed temporarily but disappears upon removal of the ether solvent by distillation at atmospheric pressure. The remaining two-phase liquid mixture is distilled in vacuo through an 8-in. helix-packed column. Material boiling at 48–49° C./0.4 mm.; $n_D^{25}$=1.4796 is collected first. Yield of $C_6H_5PF_3N(CH_3)_2$ is 19.6 parts (79%). The higher boiling residue solidifies on standing. It is distilled at higher temperature, again solidifying readily after the distillation. B.P. 128–129° C./0.15 mm. Colorless solid, M.P. ca. 50° C.; yield of $[(CH_3)_2NH_2]^{\ominus}[C_6H_5PF_5]^{\oplus}$—24.9 parts (83%)

*Analytical data*—

(1) $C_6H_5PF_3N(CH_3)_2$—Calcd.: C, 45.9; H, 5.3; F, 27.2; N, 6.7; P, 14.8. Found: C, 45.8; H, 5.5; F, 27.8; N, 7.0; P, 14.7.

IR *spectrum (pure liquid)*—3060 (sh); 2950 (m); 2882 (sh); 2817 (w; N—CH₃); 1595 (w); ca. 1470 (m, bd); 1442 (s); 1290 (s); 1195 (m); 1122 (s); 1060 (m); 1020 (vs); 1000 (w); 860 (s, bd); 779, 764, 748 (vs); 693 (s); 666 (m).

$H^1$ *NMR spectrum*—in the aliphatic region essentially two quadruplets (1–3–3–1), centered at —2.34 and —2.54 p.p.m. from TMSi (ext.), aromatic multiplet centered at ca. —7.2 p.p.m. Integration gives a ratio of aliphatic to aromatic protons of 6:5, in confirmation of the formulation $C_6H_5PF_3N(CH_3)_2$.

$F^{19}$ *NMR spectrum*—doublet of doublets ($J_{P-F}$=810 cps.); doublet of triplets ($J_{P-F}$=950 cps.).

(2) $(CH_3)_2N^{\oplus}H_2C_6H_5PF_5^{\ominus}$—Calcd.: C, 38.6; H, 5.3; N, 5.6; F, 38.1; P, 12.4. Found: C, 38.4; H, 5.5; N, 5.6; F, 37.7; P, 12.7.

The product is difficultly soluble in non-polar solvents, very soluble in acetonitrile and methanol. Upon contact with aq. NaOH, a strong amine odor is observed, as is expected for an ammonium salt.

IR *spectrum (in KBr)*—ca. 3000; ca. 2800 (bd); ca. 2100; 1525 (s); 1437 (w); 1252 (m); 1213, 1144, 1045 (s); 1020 (m); ca. 815 (vs, bd); 753, 715, 696 (vs.). Most of the bands are not very well resolved.

$H^1$ *NMR spectrum (supercooled liquid)*—sharp single resonance at —2.33 p.p.m. from TMSi; center of aromatic multiplet at —7.2 p.p.m. Integration gives H aliphat.:H. aromat.=6:5. No significant resonance due to protons bonded to nitrogen is recognized down to —1000 cps. (—16.6 p.p.m.).

$F^{19}$ *NMR spectrum (in $CH_3CN$ solution)*—essentially consisting of a doublet of doublets ($J_{P-F}$=812 cps.) and a doublet of quintuplets ($J_{P-F}$=694 cps.). The high field doublet and quintuplet are partially overlapping. The $F^{19}$ NMR spectrum is consistent with an octahedral structure of $C_6H_5PF_5^{(-)}$, with four F-atoms in planar and one in apical position.

*Example 4*

As described in Example 3, 14.6 parts of diethylamine is added dropwise over 30 min. with stirring to the solution of 36.8 parts (0.2 mole) of phenyltetrafluorophosphorane in 105 parts of ether at 0° C. A precipitate is formed which is filtered in a dry box after the addition of the amine is completed (40 min.). The weight of the crude solid is 31.6 parts of $(C_2H_5)_2N^{\oplus}H_2C_6H_5PF_5^{\ominus}$; it is held under vacuum in a desiccator. Part of the product liquifies on standing.

The ethereal filtrate obtained above is distilled in order to remove the ether, then the high boiling residue is distilled through an 8-in. helix-packed column, B.P. 81° C./1.35 mm. $n_D^{24.6}$=1.4689. Yield 18.4 parts (78%) of $C_6H_5PF_3N(C_2H_5)_2$.

*Analytical data*—

(1) $C_6H_5PF_3N(C_2H_5)_2$—Calcd.: C, 50.6; H, 6.4; F, 24.0; N, 5.9; P, 13.1. Found: C, 50.5; H, 6.0; F, 23.8; N, 5.9; P, 13.5.

Ir *(liquid)*—3055 (sh); 2978 (vs); 2960 (sh); 1595 (m); 1486, 1469, 1440, 1380, 1348 (s); 1298 (w); 1208, 1176, 1121 (vs); 1090, 1081, 1071 (s); 1048 (vs); 999 (m); 960 (vs); 852 (vs); 776, 755, 739, 692, 659 (vs).

$H^1$ *NMR (pure liquid)*—1–2–1 triplet (due to methyl protons) centered at —0.8 p.p.m. from tetramethylsilane ($J_{P-F}$=7 cps.); —CH₂— multiplet centered at ca. —2.75 p.p.m. Aromatic multiplet <—7 p.p.m. Area ratio arom.:CH₂:CH₃ protons=5:4:6, in confirmation of $C_6H_5PF_3N—(CH_2CH_3)_2$ $F^{19}$ *NMR (pure liquid)*—Doublet of doublets, $J_{P-F}$=811 cps.

doublet of triplets, $J_{P-F}$=953 cps. This spectrum is interpreted in terms of a trigonal bipyramidal structure with two F-atoms in axial and one in equatorial position.

(2) $(C_2H_5)_2N^+H_2C_6H_5PF_5^-$—Calcd.: C, 43.4; H, 6.2; F, 34.2; N, 5.1; P, 11.2. Found: C, 43.2; H, 6.3; F, 33.2; N, 5.2; P, 10.9.

An analytical sample of the product is redistilled in a high-vacuum; B.P. ca. 140°/0.1–0.05 mm.

The $H^1$ NMR spectrum of the freshly distilled product is run in acetonitrile solution. A broad, unresolved resonance due to protons bonded to nitrogen was observed at ca. —3.5 to —5.0 p.p.m. from TMSi.

The $F^{19}$ NMR spectrum in the same solvent is identical to that of $(CH_3)_2N^{\oplus}H_2C_6H_5PF_5^{\ominus}$.

IR *spectrum (in KBr and between plates)*.—2970 (s), 2800 (m, bd); 2480 (m), 1440 (s), 1388, 1330 (m); 1250 (s); 1210 (vs); 1143 (m); 1065 (s); 905, 875 (s, bd); ca. 825 (s, bd); 755 (vs); 718 (vs); 695 (vs); 679 (vs).

*Example 5*

The aminolysis of $C_6H_5PF_4$ by piperidine is conducted as described in Example 4, employing 17.0 parts of piperidine which is added dropwise with stirring at 0° to 36.8 parts of phenyltetrafluorophosphorane in 105 parts of ether. The precipitate formed is filtered in a dry box, washed with ether and dried in vacuo (0.1 mm.) over Drierite. Yield 28.7 parts (quantitative).

The product is insoluble in nonpolar solvents, very soluble in acetonitrile. It is strongly deliquescent and liquifies rapidly in the atmosphere.

*Analysis.*—Calcd. for $C_5H_{10}NH_2C_6H_5PF_5$—C, 45.7; H, 5.9; F, 32.8; N, 4.8; P, 10.7. Found: C, 45.1; H, 6.0; F, 30.6; N, 4.8; P, 10.7

IR *spectrum (solid in KBr)*—2920 (s); 2810 (sh); 2490 (m); 2094 (w); 1780 (m, bd); 1585 (m); 1524 (s); 1458, 1438 (m); 1331 (s); 1250 (s); 1211 (s, bd); 1138 (vs); 1075, 1029 (s); 945, 930, 905 (m, bd); 874 (s); 780, 755 (vs); 716 (s); 695 (s, bd).

$F^{19}$ *NMR spectrum*—The spectrum is completely identical with that given for $(CH_3)_2NH_2C_6H_5PF_5$, indicating the presence of the same anionic species.

After evaporation of the solvent from the ethereal filtrate, the residue is distilled in a high-vacuum through a 10 in. helix-packed column. Two cuts are first taken: B.P. 78°/0.2 mm. ($n_D^{25}$ −1.4936), 8.5 parts and 100–105°/0.2 mm. ($n_D^{25}$=1.5084), 10.5 parts.

Both cuts are redistilled through a 5 in. Vigreux column. Cut 1 consists of pure compound, B.P. 69°/0.05 mm.; $n_D^{25}$=1.4928. Redistillation of cut 2 gives another 3.0 g. of $C_6H_5PF_3NC_5H_{10}$, the total yield thus amounting to 11.5 parts (46%).

*Analysis.*—Calcd. for $C_6H_5PF_3NC_5H_{10}$: C, 53.0; H, 6.1; N, 5.6. Found: C, 53.1; H, 6.0; N, 5.8.

*IR spectrum (pure liquid and solution in benzene)*—2930 (m), 2860 (w); 1598 (m); 1477 (w); 1440 (s); 1334 (m), 1284 (s); 1206, 1168 (m); 1136 (s); 1070 (m); 1038 (s); 995 (w), 970 (m), 872 (vs), 849 (vs, bd); 790 (vs, bd); 749 (vs); 694 (s).

Example 6

Ethyltetrafluorophosphorane (27.2 parts) is dissolved in 84 parts of ether. At 0°, 14.7 parts of diethylamine is added dropwise with stirring to the solution of the fluorophosphorane, a precipitate being formed immediately. The addition being completed in 1 hr., part of the ether is distilled off and the liquid residue is decanted from the solid product. After complete removal of ether, the product is distilled in vacuo through a 5 in. Vigreux column. A colorless liquid is obtained; B.P. 66.5° C./30 mm.; $n_D^{25}$=1.3869. Yield 7.0 parts (37%).

*Analysis.*—Calcd. for $C_2H_5PF_3N(C_2H_5)_2$: C, 38.1; H, 8.0; F, 30.1; N, 7.4; P, 16.4. Found: C, 38.0; H, 8.1; F, 29.3; N, 7.6; P, 17.3.

*IR spectrum (pure liquid)*—2977 (s); 1486 (m); 1469 (s); 1380, 1350 (s); 1295, 1240 (m); 1208, 1177 (vs); 1090, 1073 (s); 1048 (vs); 957 (x); 859 (vs); 797, ca. 755 (vs).

$F^{19}$ *NMR spectrum*—doublet of doublets ($J_{P-F}$=825 cps.; further splitting by protons apparent), doublet of triplets $J_{P-F}$=955 cps. The spectrum is in excellent agreement with the spectra of other compounds of the type $RPF_3NR'_2$.

$H^1$ *NMR spectrum*—broad multiplet, centered at −2.62 p.p.m. from TMSi (due to $CH_2$-groups of N-ethyl group); 1-2-1 triplet at −0.98 p.p.m. ($J_{P-H}$=7 p.p.m. (arising from $CH_3$-group of N-ethyl group), partially overlapping with a broad multiplet, resulting from protons of ethyl group bonded to phosphorus. Integration shows a ratio of methylene protons (of N-ethyl group) to remaining protons=4:11, in accordance with the structure. The proton NMR spectrum is very similar to that of $$C_6H_5PF_3N(CH_2CH_3)_2$$

It was attempted to recover the solid product formed in this reaction by vacuum-distillation, since good volatility is to be expected. The product was found to solidify very readily, however, and vacuum-sublimation was the preferred method of purification (ca. 120°/0.1 mm., water-cooled probe). Yield 16.5 g. (72%). The deliquescent product was handled in a dry-box.

*Analysis.*—Calcd. for $[(C_2H_5)_2NH_2]^{\oplus}[C_2H_5PF_5]^{\ominus}$: C, 31.4; H, 7.5; F, 41.4; N, 6.1; P, 13.5. Found: C, 31.2; H, 7.6; F, 40.0; N, 6.3; P, 13.8.

*IR spectrum (in KBr and Nujol)*—3230 (m); ca. 3000 (vs, bd); 2480 (m); 1775 (vs); 1598 (m); 1457 (vs); 1390 (s); 1334 (b); 1232 (vs); 1202 (s); 1156 (s); 1081, 1043 (s); 894, 881 (m); 795 (vs); 735 (m).

$F^{19}$ *NMR spectrum*—The spectrum is very similar to that of the $C_6H_5PF_5^{\ominus}$ salts, consisting of a doublet of doublets ($J_{P-F}$=ca. 840 cps.) and a doublet of quintuplets ($J_{P-F}$=ca. 720 cps.).

Example 7

A 3-necked flask is equipped with a gas inlet tube, a reflux condenser with a drying tube, and a thermometer. Under the countercurrent of nitrogen, a solution of 8.25 parts of diethylamine in 75 parts pentane is then placed into the flask. After cooling to ca. −50°, a total of 8 g. (0.063 mole) of phosphorus pentafluoride is passed through the solution. No noticeable reaction takes place, but unreacted $PF_5$ is not observed. A viscous oil separates as the temperature is gradually allowed to rise to room temperature. The separated liquid is decanted and distilled to remove pentane. The higher boiling product comes over between 64–86° C./18 mm., mainly at the latter temperature. Purity by VPC is 95–97%, $$n_D^{25.5}=1.4046$$

*Analysis.*—Calcd. for $[(C_2H_5)_2N]_2PF_3$: C, 41.3; H, 8.7; N, 12.1. Found: C, 41.3; H, 8.9; N, 11.4.

*Molecular weight (mass spectroscopy)*—Significant peaks at 233 (parent), 161 (parent less $N(C_2H_5)_2$), etc.

*IR spectrum (liquid).*—2980 (s); 1486, 1470, 1450 (m); 1379, 1349 (s); 1297 (m); 1207, 1184 (vs); 1090, 1072 (s); 1041 (vs); 961, 942 (s); 838, 807 (vs); 736 (vs); 683 (w).

$F^{19}$ *NMR spectrum (liquid).*—Doublet of doublets, $J_{P-F}$=751 cps., $J_{F-F}$=46 p.p.m., δ(CFCl$_3$ int.)=±59.5 p.p.m.; doublet of triplets, $J_{P-F}$=875 cps.;

$$\delta(CFCl_3)=+73.9 \text{ p.p.m.}$$

This pattern is typical of trifluorophosphorane structures.

Example 8

With careful exclusion of moisture, 36.8 parts of $C_6H_5PF_4$ is dissolved in 110 parts of ether in a 3-necked flask, equipped with a thermometer, gas-inlet tube, and reflux condenser, protected with a drying tube. About 15 parts of methylamine (dried by NaOH pellets) is passed through the solution at approximately 0° C. (ice-cooling) within 1 hour. A white precipitate is formed and is filtered off in a dry box and washed with ether. The proton NMR spectrum (supercooled liquid) shows a single resonance at −1.25 p.p.m. (TMSi external reference) and a broad resonance at ca. −3.7 p.p.m. (presumably due to $H_3N-$); area ratio 1/1, indicative of $CH_3NH_3^+ + F^-$.

Distillation of the filtrate, after removal of ether, gives 15.0 parts of a colorless liquid; $CH_5PF_3NHCH_3$, B.P. 66–69°/1.5 mm., which is once redistilled through a 5-in. Vigreus column. Boiling point 42° C./0.25° mm.; $n_D^{26}$=1.4732.

*Analysis.*—Calcd. for $C_6H_5PF_3NHCH_3$: C, 43.1; H, 4.7; F, 29.2; N, 7.2; P, 15.9. Found: C, 43.5; H, 4.8; F, 28.8; N, 7.2; P, 16.0.

*IR spectrum (pure liquid).*—3450 (m); 3070, 2940 (vw); 1597 (w); 1481 (w); 1439, 1330 (m); 1160 (s); 1136 (w); 904 (vs); 880 (w); 823 (vs); 765, 752 (vs, bd); 692 (s).

$F^{19}$ *NMR spectrum (pure liquid).*—Doublet of doublets (further split by F-H coupling), $J_{P-F}$=780 cps.; doublet of triplets, $J_{P-F}$=953 cps.

Example 9

Dropwise addition over 20 min. of 18.4 parts of phenyltetrafluorophosphorane to 14 parts of N-trimethylsilyl-pyrrole gives no evolution of heat. Upon gradual increase of the temperature to 90° evolution of a gas starts. A total of 6.5 parts (70%) trimethylfluorosilane, identified by infrared, is collected in a Dry Ice trap. The brown residue is distilled in vacuo, ca. 20 parts of a colorless liquid distilling between 50° C./0.05 mm. to 85°/1 mm. being collected. Redistillation through a 4-in. Vigreux still gives 16.8 parts (73%) of

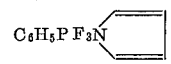

B.P. 73–74°/0.35 mm.; $n_D^{26}$=1.5134 as a colorless liquid.

*Analysis.*—Calcd. for

C, 52.0; H, 4.0; N, 6.0; F, 24.7; P, 13.4. Found: C, 52.1; H, 3.9; N, 6.2; F, 24.5; P, 13.5.

*Infrared spectrum (liquid).*—ca. 3000 (vw); 1598 (m); 1470, 1444 (s); 1332 (m); 1240 (w); 1205 (w); 1192 (vs); 1120 (s); 1092 (vs); 1040 (w); 938 (m); 873, 807, 740, 724 (vs); 687 (s).

$F^{19}$ *NMR spectrum.*—Doublet of doublets, $J_{P-F}=861$ cps., ($J_{F-F}=61.0$ cps.); doublet of triplets, $J_{P-F}=979$ cps.; ($J_{F-F}=60$ cps.). The general pattern is that of trifluorophosphoranes.

Example 10

A steel autoclave is flushed with nitrogen and charged with 265 parts of N,N-diethylaminotrimethylsilane. After cooling the charge to —80°, 240 parts phosphorus pentafluoride is added. The reaction mixture is allowed to warm up slowly to room temperature, an exothermic reaction taking place, which is controlled by cooling with water. After being held for 2 hrs. between 40–60° C., the reaction mixture is cooled to below 0° and discharged as a liquid directly into a distillation flask. The trimethylfluorosilane formed (B.P. 17°) is distilled off through a 12-in. helix packed column. The higher boiling product is distilled through a 25-in. spinning band column. Some forerun 70–98° C. being discarded, 161 parts (49.2 %) of diethylaminotetrafluorophosphorane is collected (B.P. 98–101° C.). Boiling point (after one redistillation) 99–100° C. The product fumes strongly in the atmosphere, but is apparently stable in glass over prolonged periods.

*Analysis.*—Calcd. for $(C_2H_5)_2N \cdot PF_4$: C, 26.8; H, 5.6; N, 7.8; F, 42.5; P, 17.3. M.W. 179.1. Found: C, 27.0; H, 5.5; N, 7.9; F, 41.6; P, 17.5; 180±1*.

*IR spectrum (pure liquid).*—700–100 cm.$^{-1}$ in kerosene: 2985 (s); 1493, 1475, 1454 (m); 1386, 1354 (s); 1299, 1254 (w); 1214, 1180 (s); 1060 (vs); 973 (s); 934, 861 (vs); 799, 683 (m).

$F^{19}$ *NMR spectrum.* — Doublet; $J_{P-F}=851$ cps.; $\delta=+66.5$ p.p.m. ($CFCl_3$ as internal reference).

The following two examples show the preparation of $(NO)^+(C_6H_5PF_5)^-$.

Example 11

A wide-neck polyethylene bottle is equipped with a Kel-F inlet tube, ending 20 mm. above the bottom of the bottle, and a short outlet tube, which is connected to two polyethylene tubes, filled with Drierite. Air is removed from the bottle by flushing with dry nitrogen, and in a countercurrent of nitrogen, 46 parts of phenyltetrafluorophosphorane and 250 ml. of Freon 113 is placed in the bottle. 12.9 parts of nitrosyl fluoride is condensed in a 30 ml. Monel cylinder, connected to the gas inlet tube via a flow meter which is constructed of Monel, Teflon, and Tygon parts only and filled with a halocarbon oil. The temperature of the solution of phenyltetrafluorophosphorane in Freon 113 is maintained at —30 to —40° C., while NOF is added at a rate of ca. 3 parts/hr. with magnetic stirring. A light orange solid precipitates immediately, its amount increasing steadily. The addition being completed after 4.5 hrs., the precipitate is filtered immediately under a nitrogen blanket through a polyethylene Büchner funnel which is cooled with Dry Ice from the outside. The crude product thus obtained (containing "Freon" solvent) is transferred under nitrogen protection into a 250 ml. round-bottom quartz flask, which is attached immediately to a rotating evaporator. Material volatile at 0.1 mm. is pumped off while the flask is immersed in a bath held at ca. —20 to —10°, in order to prevent decomposition of the product. After 3 hrs., the now dust-dry material is transferred to a polyethylene storage bottle and stored at —40° C.

\* By mass spectroscopy.

*Analysis.*—Calcd. for $(NO)^+(C_6H_5PF_5)^-$: C, 30.9; H, 2.2; F, 40.8; N, 6.0; P, 13.3. Found: C, 30.9; H, 2.4; F, 39.9; N, 4.7; P, 13.2.

Example 12

The apparatus used is as described in Example 11. After the polyethylene reaction vessel has been flushed with dry nitrogen, 27.6 parts of phenyltetrafluorophosphorane is charged in a countercurrent of nitrogen. Ca. 200 ml. of Freon 12 (miscible with the fluorophosphorane) is then condensed into the reaction vessel. 9.6 parts of NOF is employed in the experiment. The reaction proceeds equally well at —40° C. as well as at —80° C., clearly showing the advantage of the Freon 12 solvent over Freon 113, the former still being highly mobile at these low temperatures, while Freon 113 turns very viscous even well above its freezing point. The adduct, almost colorless at —80° and faintly orange-yellow at —20°, is recovered as in the Example 11. Volatile products are again pumped off, first at 100 mm., then at 1 mm. to leave the adduct in quantitative yield, based on the amount of fluorophosphorane employed.

*Analysis.*—Calcd. for $(NO)^+(C_6H_5PF_5)^-$: C, 30.9; H, 2.2; F, 40.8; N, 6.0; P, 13.3. Found (2 different prepns.) (a) C, 31.1; H, 2.8; F, 40.3; N, 4.1*; P, 13.3. (b) C, 31.1; H, 2.4.

Substitution of $C_2H_5PF_4$, $CH_3PF_4$, $CF_3PF_4$, $C_3H_7PF_4$, or $p$-$CH_3C_6H_4PF_4$ for the $C_6H_5PF_4$ on a molar basis gave $$(NO)^+(C_2H_5PF_5)^-, \ (NO)^+(CH_3PF_5)^-$$
$$NO^+CF_3PF_5^-, \ (NO)^+(C_3H_7PF_5)^-$$
and
$$(NO)^+(p\text{-}CH_3C_6H_4PF_5)^-$$

in a similar manner.

Example 13

This example shows the utility of $(NO)^+(C_6H_5PF_5)^-$ as a nitrosating agent as well as the preparation of $[(CH_3)_2NH_2]^\oplus[(C_6H_5PF_5]^\ominus$.

4.1 parts of dimethylamine is dissolved in a dry atmosphere in 70 ml. of ether cooled to —10°.

$$NOF \cdot C_6H_5PF_4$$

(10.0 parts) is added to this solution with stirring in small portions and a white precipitate appears which turns to a light-brown oil, settling from the ether solution when allowed to warm up to room temperature. The ether solution is decanted from the oil and the ether removed by distillation. Distillation of the residue in vacuo through a 5-in. Vigreux column gives 2.45 g. (76%) of dimethylnitrosamine as a light yellow liquid, B.P. 54°/21 mm.; $n_D^{25}=1.4343$. Identification is by infrared spectrum and analysis.

*Analysis.*—Calcd. for $(CH_3)_2N \cdot NO$: C, 32.4; H, 8.2; N, 37.8. Found: C, 32.3; H, 8.5; N, 37.5.

The higher boiling brown oil is also distilled through a 5-in. Vigreux-column; B.P. 140–142°/0.5 mm. Yield 7.2 g. (67%). The product crystallizes readily on standing.

*Analysis.*—Calcd. for $[(CH_3)_2NH_2]^\oplus[C_6H_5PF_5]^\ominus$: N, 5.6; C, 38.6; H, 5.3. Found: N, 5.75; C, 38.2; H, 5.0.

Infrared spectrum (in KBr) and $F^{19}$ NMR spectrum show that the product is completely identical to independently obtained dimethylammonium pentafluorophenylphosphate from Example 3.

Example 14

This example shows the utility of $(NO)^+(C_6H_5PF_5)^-$ as a diazotizing agent.

In an atmosphere of dry nitrogen, 5.2 parts 2,4-dimethylaniline is dissolved in 70 ml. dichloromethane. The solution is cooled to —80°, and 10 parts $$(NO)^+(C_6H_5PF_5)^-$$

*Nitrogen analyses by the Dumas method were consistently low.

is added in small portions in a countercurrent of nitrogen with magnetic stirring over 2 hrs. The dark mixture is then allowed to warm up to room temperature (1 hr.), no significant evolution of gas being observed. A dark brown residue is left upon removal of the products volatile at 200 mm., which is found by VPC to contain a new compound (ca. 45%).

The residue is washed with water, extracted 2 times with 50 ml. of ether and worked up as usual. Distillation through a 5 in. Vigreux column in vacuo gives a 48.7% yield of 2,4-$(CH_3)_2C_6H_3F$, a colorless liquid, B.P. 60–61°/39 mm.; $n_D^{25}$=1.4739, VPC showed this material to be 100% pure.

*Analysis.*—Calcd. for $C_8H_9F$: C, 77.4; H, 7.3; F, 15.3. Found: C, 77.2; H, 7.6; F, 14.8.

Example 15

A solution of 11.7 parts of $(NO)^+(C_6H_5PF_5)^-$ in 150 parts of nitromethane is prepared and cooled to −10° C. $BF_3$ is passed through until in molar excess of the $$(NO)^+(C_6H_5PF_5)^-$$

adduct. After about 15 minutes a white solid settles out which is filtered off. This white solid has an infrared spectrum identical to a sample of $NOBF_4$. Vapor-phase chromatography of the liquid residue from which the solid is filtered shows the presence of $C_6H_5PF_4$ in 75% yield.

Example 16

A solution of NOF (7.0 parts) in Freon 12 is cooled to −80° C. and $C_2H_5PF_4$ (13.6 parts) is added dropwise. A deliquescent white precipitate is instantaneously formed. The infrared spectrum in Nujol shows absorption at 2320 and 1800 cm.$^{-1}$, characteristic of the N=O and N≡O group, and at 740 and 775 cm.$^{-1}$ in the P–F stretching region. The white solid is stable for several months at room temperature.

Example 17.—Bis-diethylaminotrifluorophosphorane

A mixture of 17.9 parts of diethylaminotetrafluorophosphorane and 11.6 parts of diethylaminotrimethylsilane is placed under nitrogen protection in a Monel cylinder. The cylinder is cooled to −190° C., evacuated to 0.7 mm. and heated at 150–170° C. for 2.5 hrs. Material volatile at room temperature is pumped off under vacuum (200 mm.) and condensed in a Dry Ice trap. 4.5 parts (61%) of trimethylfluorosilane, pure by VPC and IR, is obtained.

The higher-boiling product is transferred to a distillation apparatus. At 150 mm., 1.0 part of unreacted diethylaminotetrafluorophosphorane is recovered, followed by 19.0 parts (82%) of a colorless liquid, B.P. 79°/14 mm.; $n_D^{25}$=1.4049. The product is 100% pure $$((C_2H_5)_2N)_2PF_3$$

by vapor phase chromatography.

*Analysis.*—Calcd. for $[(C_2H_5)_2N]_2PF_3$: C, 41.3; H, 8.7; F, 24.5; N, 12.1. Found: C, 41.3; H, 8.7; F, 24.7; N, 12.3. Calcd.: P, 13.3. Found: 12.9.

Mol. wt. (*mass spectroscopy*).—Found 232 (calcd. 232).

Examples 18 through 22

The following examples illustrate the use of compounds of the present invention as cocatalysts for the polymerization of ε-caprolactam.

In these examples, a mixture of 22.6 parts of ε-caprolactam and base (sodium hydride diluted with mineral oil) is placed in a reaction vessel which is immersed in an oil bath at 150° C., nitrogen is bubbled through the molten caprolactam at the rate of 350 cc./minute. After heating for 20 minutes the cocatalyst to be used is added to the molten caprolactam at 150° C. The course of the polymerization is observed visually and the time from the addition of the cocatalyst to the time at which no perceptible flow of the polymerized melt occurred when the reaction vessel is held at a 45° angle is observed. This is recorded as "no flow time." The polymers made using the cocatalysts of this invention are off-white and tough.

| Example | Cocatalyst | | Catalyst | | No Flow Time (min.) |
|---|---|---|---|---|---|
| | Structure | Wt. (g.) | Name | Wt. (g.) | |
| 18 | $(C_2H_5)_2NPF_4$ | 0.2149 | NaH/oil 50/50 by wt | 0.288 | 2.0 |
| 19 | $C_2H_5PF_3N(C_2H_5)_2$ | 0.1515 | do | 0.288 | 3.0 |
| 20 | $C_6H_5PF_3N(CH_3)_2$ | 0.1673 | do | 0.288 | 7.0 |
| 21 | $(C_2H_5)_2NH_2)^+(C_6H_5PF_5)^-$ | 0.2218 | do | 0.288 | 7.0 |
| 22 | $((C_2H_5)_2N)_2PF_3$ | 0.2787 | do | 0.271 | 4.0 |

I claim:

1. A compound selected from the group consisting of $(R_2^1NH_2)^+(RPF_5)^-$ and $(R_2^1N)_aPF_c$, wherein R is an aromatic, aliphatic and alicyclic radical having up to 8 carbon atoms and a divalent radical both valences of which are attached to the nitrogen forming a heterocyclic ring having up to 8 carbon atoms and $R^1$ is an aliphatic and alicyclic radical having up to 5 carbon atoms, $a$ is 1 through 2, and the sum of $a$ and $c$ is 5.

2. $(C_2H_5)_2NPF_4$.
3. $((C_2H_5)_2N)_2PF_3$.
4. $((CH_3)_2NH_2)^+(C_6H_5PF_5)^-$.
5. $((C_2H_5)_2NH_2)^+(C_6H_5PF_5)^-$.
6. $(C_5H_{10}NH_2)^+(C_6H_5PF_5)^-$.
7. $((C_2H_5)_2NH_2)^+(C_2H_5PF_5)^-$.

8. A process which comprises reacting $R^4PF_4$ with $(R_2^1N)_{4-n}R^2$ at about from −40 to 200° C. wherein $R^4$ is selected from the group consisting of organic aliphatic, aromatic and alicyclic radicals of up to 8 carbon atoms, fluorine, and $R_2^1N$; $R^1$ is selected from the group consisting of aliphatic and alicyclic radicals of up to 5 carbon atoms, $R^2$ is hydrogen and $n$ is 3.

9. The process of claim 8 wherein $R^4$ is phenyl, $R^1$ is methyl and $n$ is 3.

10. The process of claim 8 wherein $R^4$ is fluorine, $R^1$ is ethyl and $n$ is 3.

11. The process of claim 8 wherein the temperature is about from 0° to 70° C.

No references cited.

WALTER A. MODANCE, *Primary Examiner.*

A. D. SPEVACK, *Assistant Examiner.*